April 15, 1969     J. T. WILLIAMS     3,438,318
TOASTER
Filed Sept. 15, 1967
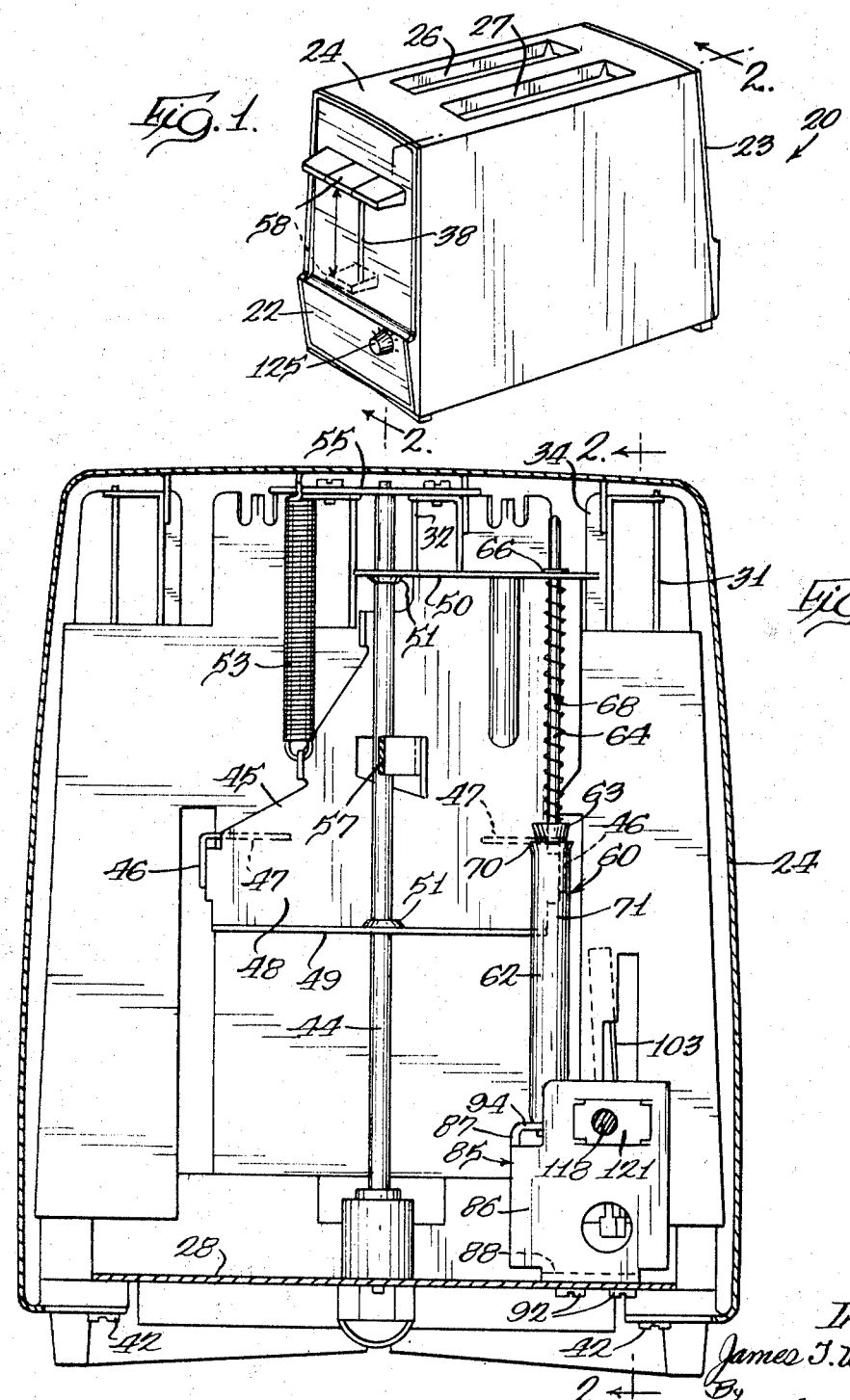
Inventor:
James T. Williams
By Robert W. Dudley
Atty

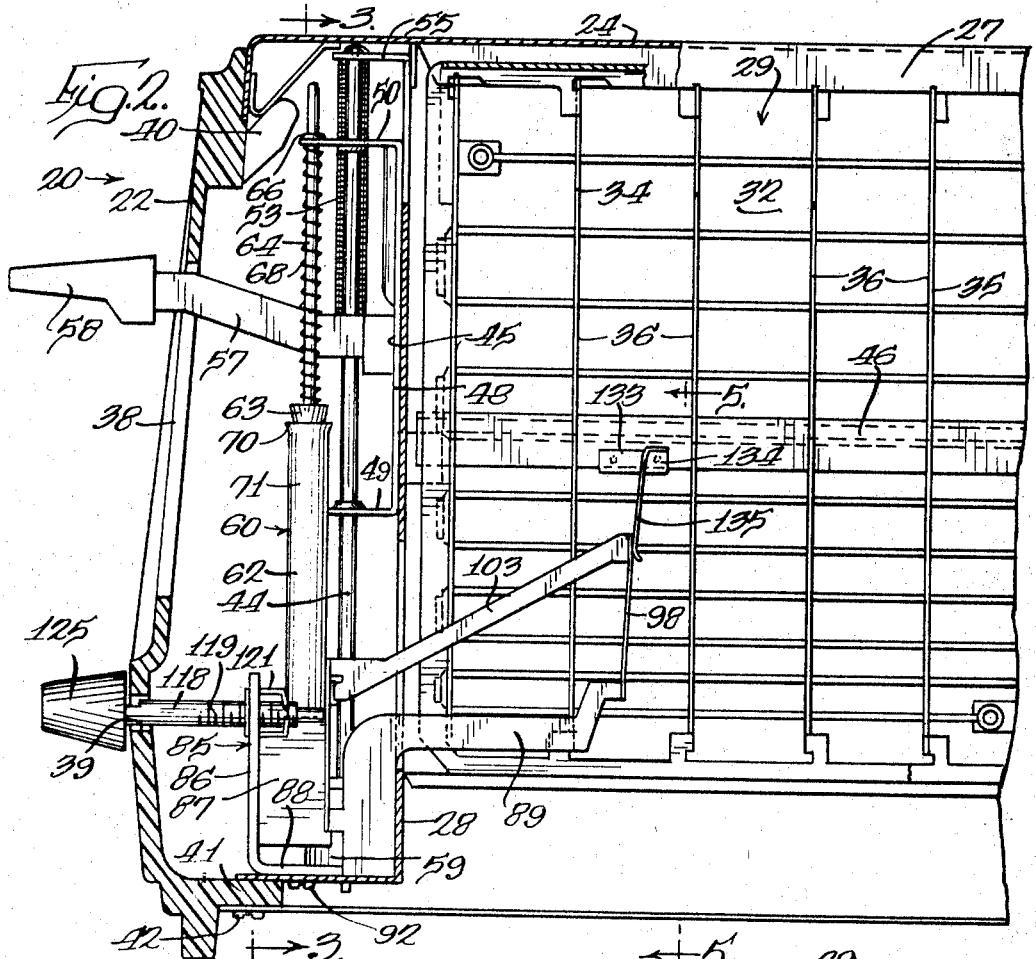
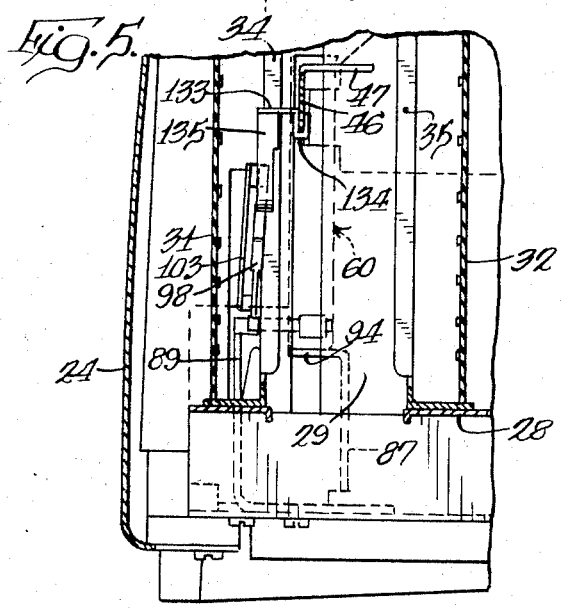
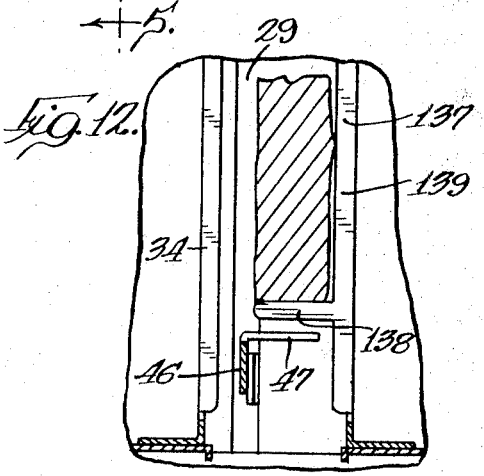

April 15, 1969  J. T. WILLIAMS  3,438,318
TOASTER
Filed Sept. 15, 1967  Sheet 3 of 4

Inventor:
James T. Williams
By Robert W. Dudley
Atty

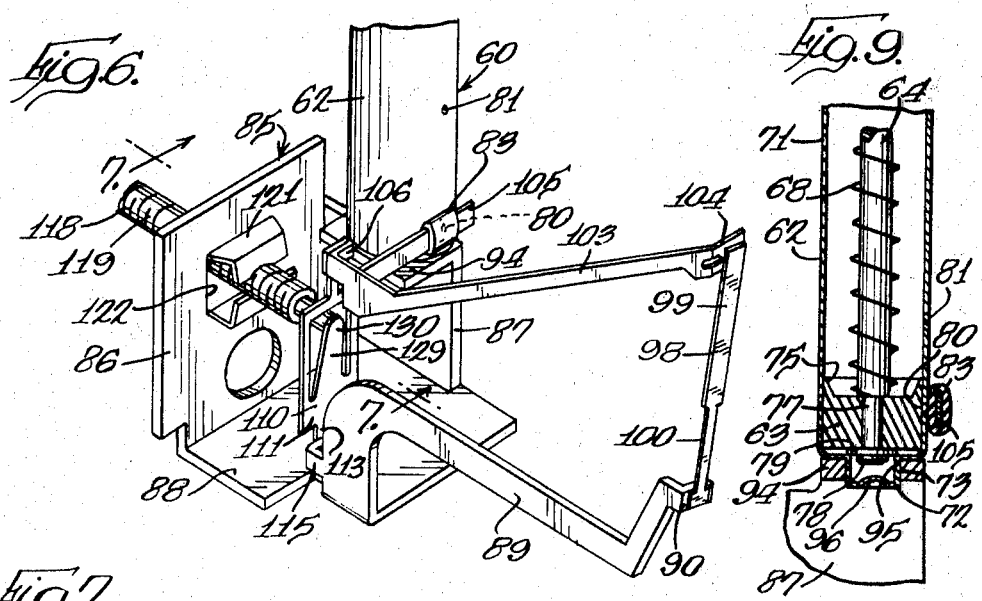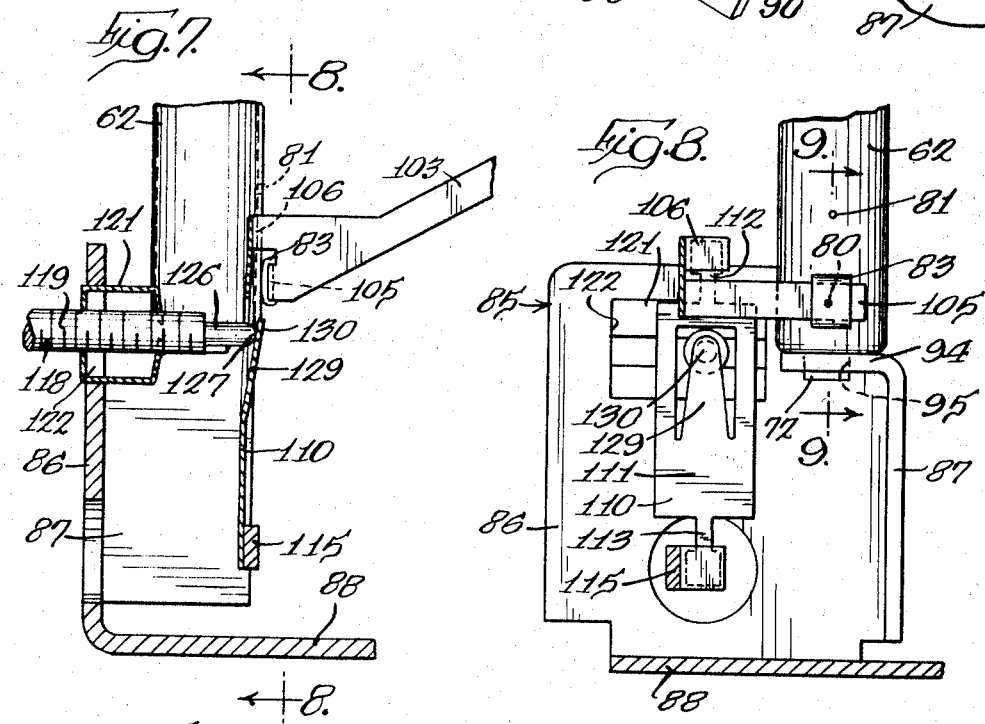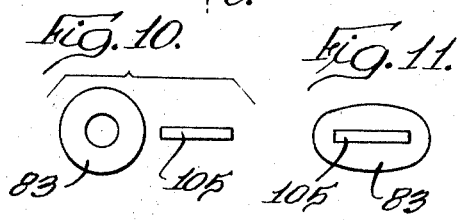

United States Patent Office

3,438,318
Patented Apr. 15, 1969

3,438,318
TOASTER
James T. Williams, Downers Grove, Ill., assignor to Sunbeam Corporation, Chicago, Ill., a corporation of Illinois
Filed Sept. 15, 1967, Ser. No. 667,956
Int. Cl. F24c 7/08
U.S. Cl. 99—329                                                19 Claims

ABSTRACT OF THE DISCLOSURE

An electric toaster with pneumatic latching means for latching the bread carriage in the toasting position. At the end of a toasting cycle, temperature responsive means permitting air to enter the pneumatic latching means with the result that the movable piston embodied therein is free to move to permit the return of the carriage to its upper or bread slice receiving position.

Background of the invention

The present invention relates to electric toasters and, more particularly, to electric toasters of the automatic or semi-automatic type wherein the time interval during which a bread slice is toasted is selectively and automatically controlled to provide for uniform toasting action of successive bread slices placed in the toaster.

Most automatic toasters of the type described include complicated and costly mechanisms for controlling the toasting action on bread slices placed in the toaster. Generally, these toasters include an arrangement wherein bread slices are inserted into the toaster and are supported on a movable toast carriage disposed between opposed facing heating elements of a toasting chamber. The toast carriage is then either manually or automatically moved to a toasting position wherein the bread is toasted to a selected degree or color, and the carriage is then released automatically at the end of a toasting interval to move upwardly in a pop-up action to a position wherein the bread can be removed from the toaster for consumption.

One of the problems associated with previous toasters of the type described is that of obtaining a uniform selected degree of toasting of successive bread slices placed in the toaster even though ambient temperature conditions in the toaster change from time to time after the toasting of the initial bread slice placed in the toaster. Another problem of previous toasters is in providing a latching mechanism for maintaining the toast carriage in a toasting position which is foolproof in operation and easily releasable at the end of a toasting cycle.

Accordingly, it is an object of the present invention to provide an electric toaster having an improved means for holding the bread carriage in a toasting position and releasing the carriage after a toasting cycle is completed.

Another object of the present invention is to provide an electric toaster having an improved system for controlling the toasting action whereby the toast carriage is easily released from the toasting position at the completion of a selectively adjustable toasting cycle.

Further objects and advantages of the present invention will become apparent as the following specification proceeds, and the features of novelty which characterize the invention will be pointed out with particularity in the claims annexed to and forming a part of the specification.

Summary of the invention

The invention relates to an electric toaster comprising a frame structure and a bread carriage movable between a pair of opposed, facing heating elements carried on said frame between a normal or upper non-toasting position and a lower toasting position. Bread slices are placed on the bread carriage which is moved downwardly to the toasting position with the opposed sides of the bread slice exposed to the heating elements for toasting. Pneumatic means interconnecting the movable bread carriage and the frame is mounted at one end of the toast carriage and includes a cylinder having a closed end and a piston movable therein toward the opposed end when the bread carriage is moved to the toasting position. The bread carriage is maintained or latched in the toasting position by the suction action between the piston and the closed end of the cylinder, and the carriage is released for movement back to the upper or normal position by admitting atmospheric air into the lower end of the cylinder through a valve opening.

The valve opening is normally maintained in a closed condition by a valve element which is connected to a thermally responsive control element positioned adjacent to the bread slice in the toasting position on the carriage. As the bread slice is toasted, the thermally responsive element moves in accordance with the degree of toasting action and after a selected amount of movement, the element opens the valve opening permitting the toast carriage to rise terminating the toasting cycle.

Other novel features of the toaster will become apparent from the more detailed description, and these include the interrelating functional aspects of the color control system and the carriage latching and release mechanism.

Brief description of the drawing

For a better understanding of the present invention, reference may be had to the accompanying drawing in which:

FIG. 1 is a perspective view of a new and improved toaster constructed in accordance with the features of the present invention with the toaster carriage in its upper or normal non-toasting position;

FIG. 2 is an enlarged fragmentary sectional view taken substantially along line 2—2 of FIG. 1;

FIG. 3 is a sectional view taken substantially along line 3—3 of FIG. 2 assuming that FIG. 2 shows the entire structure;

FIG. 5 is a fragmentary sectional view taken substantially along line 5—5 of FIG. 2 assuming that FIG. 2 shows the entire structure;

FIG. 6 is a fragmentary perspective view of the pneumatic latch and thermostatic control assembly;

FIG. 7 is a fragmentary sectional view taken substantially along line 7—7 of FIG. 6;

FIG. 8 is a fragmentary sectional view taken substantially along line 8—8 of FIG. 7 assuming that FIG. 7 shows the entire structure;

FIG. 9 is a fragmentary sectional view taken substantially along line 9—9 of FIG. 8;

FIG. 10 is a sectional view of the valve pad and the portion of the actuator arm which supports the pad prior to assembly;

FIG. 11 is similar to FIG. 10 except that the valve pad is assembled to the actuating arm; and FIG. 12 is a fragmentary view of an alternate embodiment wherein the bread guides support the slice of bread when the bread carriage is latched at its lower position.

Description of the preferred embodiments

Figure 4:
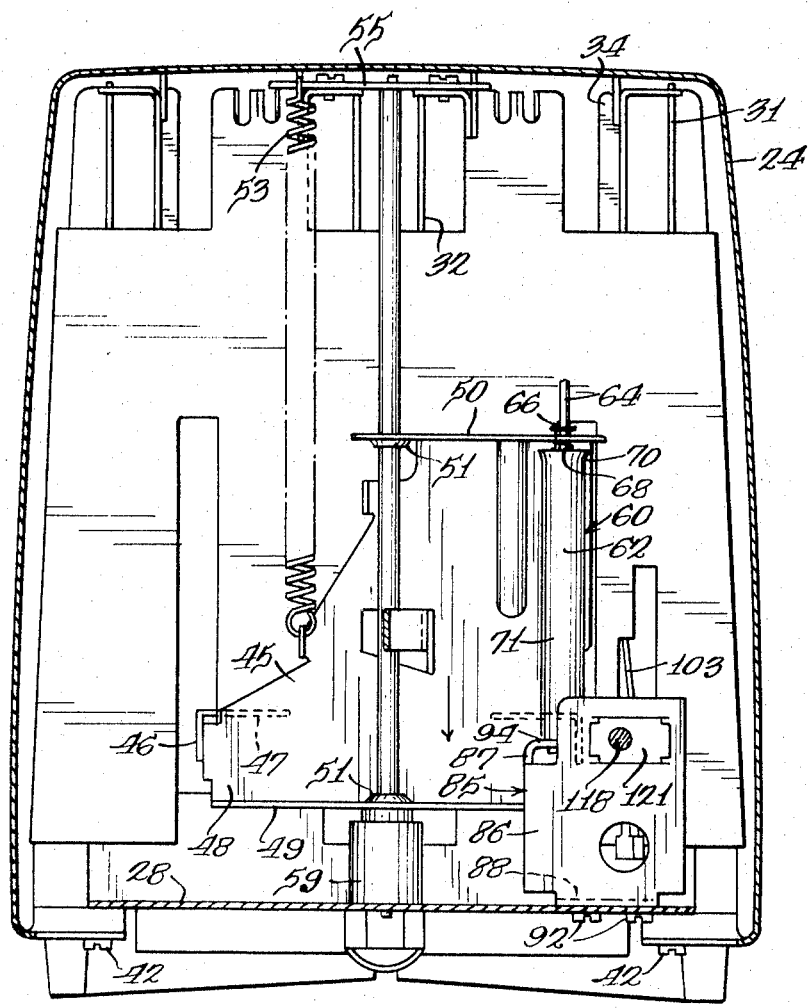
FIG. 4 is generally the same as FIG. 3, except that the bread carriage is in its lower toasting position.

Referring now to the drawing, there is illustrated an electrically operated toaster referred to generally by reference numeral 20. The toaster 20 is preferably constructed similar to the toaster disclosed in Jepson et al. Patent No. 3,279,352 which is assigned to the same assignee as in this present application and includes an outer housing or enclosure defined by a pair of opposite end panels 22 and 23, an outer shell 24 of U-shaped cross section and a base member or frame 28.

The shell 24 is provided with a pair of spaced, elongated bread receiving slots 26 and 27 which define the entrance to a pair of toasting chambers, one of which, 29, is illustrated. Each toasting chamber is provided with spaced-apart, upstanding heating units 31 and 32 which define opposite sides of toasting chamber 29. The frame 28 is illustrated as including a somewhat U-shaped, integral metal stamping with support flanges projecting from the legs of the U. Disposed within toasting chamber 29 are a pair of oppositely facing stamped bread guides 34 and 35 with their lower ends attached to frame 28. It should be noted that the bread guides consist of a plurality of spaced, vertically extending ribs 36 which are positioned immediately in front of the heating units and are in alignment with bread receiving slot 27 so that when a slice of bread is inserted into the slot 27, the bread guide ribs 36 control its vertical movement within the toasting chamber in order to prevent contact with the heating units and to assure that the slice of bread will be properly oriented with respect to the heating units.

Referring again to FIG. 2, it may be easily seen that end panel 22, which is preferably molded from a suitable plastic, includes a vertically extending slot 38 and an opening 39 providing access for controlling the mechanism contained within toaster 20. Holding the end panel 22 in proper position is end panel projection 40 adapted to cooperate in locking relationship with the outer shell 24 and a horizontally extending panel ledge 41 which is fastened to the frame 28 by suitable screws 42.

Fixedly fastened to frame 28 is vertically extending post 44 which is used to guide and support a bread carriage 45. The bread carriage 45 is preferably formed from a sheet metal stamping and includes a pair of parallel, spaced racks 46 which extend horizontally across the toasting chambers and have transversely projecting fingers 47 for supporting slices of bread thereon. Both racks 46 are integral with a vertically extending wall portion 48 having at its lower end a horizontally disposed shelf 49 and at its upper end horizontal wall portion 50. For relating the bread carriage 45 to the vertical post 44, both the shelf 49 and the horizontal wall portion 50 include a projection 51 containing aligned openings which receive the shaft in sliding engagement. Consequently, the bread carriage 45 can move vertically between an upper bread receiving and bread withdrawing position as illustrated in FIGS. 1, 2 and 3 and a lower bread toasting position as illustrated in FIG. 4. Biasing the bread carriage upwardly to the bread receiving position is tension spring 53 which is attached at its lower end to the bread carriage and at its upper end is fastened to a stationary frame member 55 which also assists in rigidly supporting the post 44. Therefore, unless the bread carriage 45 is acted upon, it will remain in its upper position which may be considered its normal position. Furthermore, if the bread carriage is acted upon and moved to its bread toasting position and thereafter released, it will be returned to its upper position due to the urging of spring 53. In order that the user may selectively lower the bread carriage 45 after placing slices of bread on the racks 46, the carriage is provided with an integral, horizontally extending lever 57 which extends through end panel slot 38. To assist the user in operating bread carriage lever 57, a suitable knob 58 is attached to its free end. Limiting the downward travel of the bread carriage 45 is abutment member 59 which is disposed at the bottom of post 44 and in alignment with shelf 49 so that when the user presses downwardly on knob 58, the bread carriage will move downwardly until the shelf 49 engages with abutment member 59.

For the purpose of releasably latching the bread carriage 45 in its lower toasting position, there is provided a pneumatic latching means generally referred to by reference numeral 60 and includes a vertically extending cylinder 62 and a piston 63 to which is attached a vertically extending piston rod 64. As may be seen in FIG. 2, piston rod 64 extends through an opening in bread carriage horizontal wall portion 50. Rigidly locked to the piston rod 64 near its upper end is a transversely extending snap on clip 66. Inasmuch as the snap on clip 66 is disposed above the horizontal wall portion 50, the upward movement of the wall portion causes it to abut against the clip pulling the piston rod 64 upwardly. To urge the piston rod 64 downwardly when the bread carriage 45 is moved downwardly is compression spring 68 which is disposed around the rod between the wall portion 50 and the piston 63. Consequently, the downward movement of the bread carriage 45 biases the piston 63 downwardly within the cylinder 62.

As may be conveniently seen in FIGS. 2 and 9, the vertically extending cylinder 62 has a flared open upper end 70, a cylinder portion 71 extending most of its length and a well portion 72 having a reduced cross section and formed with a non-uniform peripheral wall 73. In this instance it has a four-sided square configuration. It should be noted that the bottom of cylinder 62 is integrally formed so that no air can escape through the means fastening the cylinder to the toaster. As seen in FIG. 9, piston 63 has an outwardly flared sealing lip 75 with a relatively sharp, inverted V-shaped cross section and a central opening allowing the piston rod reduced diameter portion 77 to extend therethrough so that an enlarged diameter rod lower end 78 extends therebelow. To insure that the piston 63 remains in locked relationship to the piston rod 64, a snap on fastening clip 79 is inserted on the reduced diameter portion 77 between the enlarged diameter rod end 78 and the bottom surface of the piston 63.

For the purpose of controlling the flow of air into and out of cylinder 62, it is formed with a lower valve port 80 and a spaced upper aperture 81. Selectively closing the lower valve port 80 is a horizontally movable valve pad 83. When it is desired to lower the bread carriage 45 to the lower toasting position, the user moves the knob 58 downwardly causing the bread carriage to move downwardly until the shelf 49 comes into engagement with the abutment member 59. As this is happening, the bread carriage horizontal wall portion 50 pushes downwardly on compression spring 68 causing the piston 63 to move downwardly in sliding engagement within cylinder 62. The air within the cylinder 62 below the piston 63 is forced outwardly through aperture 81 and around the piston sealing lip 75. After the sealing lip 75 has passed the aperture 81, the air escapes only around the piston sealing lip 75 so that there is slightly more resistance to the movement of the bread carriage beyond this point. The piston 63 continues downwardly until it abuts against the bottom of the cylinder 62, and the enlarged diameter portion 78 is received within the cylinder well portion 72 in such a manner as to nearly displace all of the air between the piston 63 and the bottom of the cylinder 62. For the purpose of lessening the tolerances necessary to construct this toaster, the relationship between the abutment member 59 and the cylinder 62 in such that the piston 63 strikes against the bottom of the cylinder 62 prior to the bread carriage shelf 49 coming into engagement with the abutment member 59. After the piston 63 engages the bottom of the cylinder 62, the further downward movement of the bread carriage merely compresses spring 68 and does not cause any further downward travel of the piston rod 64. Therefore, it is not required to have close tolerances to insure that the piston and piston rod do not become damaged due to the bread carriage being forced downwardly by the user and to insure that the piston bottoms within the cylinder. After the user releases the knob 58, the bread carriage spring 53 urges the bread carriage to return to its upper position. However, since nearly all of the air has been displaced from the bottom of the cylinder 62, the piston rod 64 and piston 63 move upwardly a very short distance creating a sub-atmospheric pressure within the bottom of the cylinder 62 which prevents further upward movement of the bread carriage and, consequently, latches it in the lower toasting position. In this state, the upward force exerted upon the bread carriage by spring 53 is counterbalanced by the weight of the bread carriage plus the bread disposed thereon and the force imposed upon the piston 63 due to the pressure differential between the sub-atmospheric pressure below the piston 63 and normal atmospheric pressure above the piston. Naturally, during the latching sequence, the valve pad 83 is in its normal closed position preventing passage of air through valve port 80.

Supporting the cylinder 62 within the toaster 20 is a unitary bracket 85 preferably formed from sheet metal having a first vertical wall 86, a second vertical wall 87 disposed normal to the first vertical wall 86, flat horizontal wall 88 and an angular extending arm 89 terminating at a remote end having a vertical surface 90 which is spaced and substantially parallel to first vertical wall 86. The bracket 85 is rigidly secured to frame 28 by means of screws 92 being in threaded locking engagement with flat horizontal wall 88. To support the cylinder 62, the second vertical wall 87 has a bent over horizontally extending upper portion 94 formed with a non-uniform opening 95 complementary to the peripheral well wall 73 which extends therethrough. In the present instance, the well 72 has a square-shaped peripheral wall 73 which extends into the square opening 95 in the horizontal upper portion 94. Preferably, there is a very close or press fit between the peripheral well wall 73 and the opening 95 to rigidly fasten and orient the cylinder 62 to the bracket 85. To insure the integrity of the connection between the cylinder 62 and the bracket 85, the bottom wall of the well 72 is upset at its center 96 causing the well wall 73 to enlarge. It will be appreciated that the non-uniform configuration of the peripheral wall 73 is of great assistance in properly aligning the valve port 80 with respect to the valve pad 83 and also preventing any possible subsequent angular displacement between the cylinder 62, the bracket 85 and the valve pad 83.

In order to control the color to which the bread is toasted and to actuate the valve pad 83, there is provided a bimetallic element 98 having a relatively wide upper portion 99 and a relatively narrow lower portion 100 which is attached at its lower end to the vertical surface 90 at the end of bracket arm 89 by a suitable means such as welding. The bimetallic element 98 is oriented so that the high expansion side is facing away from the cylinder 62, and the element is also oriented so that it is disposed within the toasting chamber 29 with its edges facing towards the heating unit 31 and the location that the bread would assume if the bread carriage were in the toasting position. The top of the bimetallic element upper portion 99 is preferably welded to actuator arm 103 at its bent end 104 which lies in a substantially vertical plane with the bimetallic element 98. As may be seen in FIGS. 2, 6, 7 and 8, the actuator arm 103 which is relatively rigid, angles downwardly towards the bottom of cylinder 62 and includes near the end remote from bent end 104 a transversely extending finger 105 and a much shorter parallel spaced projection 106. Even though the actuator arm 103 extends angularly downwardly, the bent end 104, finger 105 and projection 106 are all substantially parallel and vertically disposed. The previously discussed valve pad 83 is supported on finger 105 and moves therewith. Closing the loop, including arm 89, bimetallic element 98 and actuator arm 103, is a substantially vertically extending restrictor spring 110 preferably fabricated from a relatively thin flexible sheet material. The restrictor spring 110 has a relatively wide central body portion 111 and upper necked down portion 112 which is welded to actuator arm projection 106 and a lower necked down portion 113 which is welded to a bent tab 115 extending from the arm 89 at a location adjacent to the bracket flat horizontal wall 88. With this closed loop construction, the bimetallic element 98 is substantially parallel to the restrictor spring 110.

When a slice of bread is inserted into bread receiving slot 27 onto bread carriage rack 46 and the bread carriage 45 is moved to its lower toasting position and retained there by pneumatic latching means 60, the heating units 31 and 32 are electrically energized commencing the toasting cycle. The bimetallic element 98 is disposed adjacent to the slice of bread and is oriented to sense the surface temperature thereof. The wide upper portion 99 becomes hotter than the narrow lower portion 100 since the temperature within the toasting chamber 29 is hotter at the top than the bottom. Inasmuch as the upper end of the bimetallic element 98 is restricted in its movement because it is welded to rigid actuator arm 103, the element bows away from the cylinder 62 and forms a slightly S-shaped configuration with the portion of the upper bimetallic element welded to the actuator arm bent end 104 remaining substantially in a vertical plane. The bimetallic element 98 bows away from the cylinder 62 because its upper end is restricted by the closed loop construction and due to the fact that the relatively wide upper portion 99 is much stronger and dominates the relatively narrow lower portion 100. One of the primary functions of the narrow lower portion 100 is to compensate for the changing ambient temperature within the toaster and this is accomplished by it being disposed near the bottom of the toasting chamber and not being effected as much as the upper portion 99 by the relating cool moisture escaping from the bread slice being toasted. As the actuator arm 103 moves horizontally away from the cylinder 62, the valve pad 83, which is disposed on actuator arm finger 105, moves horizontally to open the valve port 80 allowing air at atmospheric pressure to enter behind the piston sealing lip 75 permitting the bread carriage spring 53 to raise the bread carriage to the upper bread withdrawing position. As soon as the piston sealing lip 75 moves upwardly so that it passes aperture 81, air can also move through this aperture behind the piston to accelerate its upward movement. It should be appreciated that the valve pad 83 moves relatively slowly away from the valve port 80, and consequently, the piston 63 moves initially at a very slow rate upwardly. However, the piston sealing lip 75 is disposed a very short distance below the aperture 81, and as a result, the piston 63 has to move just a very short distance for the sealing lip 75 to pass above the aperture 81 allowing air to move in behind the piston 63. Thus, air entering aperture 81 and to a lesser extent through valve port 80 permits the piston 63 and bread carriage 45 to move upwardly at a controlled slow speed and thereby prevents spring 53 from raising the carriage too rapidly. In FIG. 9, the piston is disclosed at the bottom of its travel before it moves upwardly to its holding or toasting position where the sealing lip 75 is spaced just below the aperture 81 wherein the air pressure between the bottom of the cylinder 62 and the piston 63 is sufficient to hold and latch the bread carriage in the toasting position.

If for any reason the user wishes to raise the bread carriage after the start and before the end of the toasting operation, the knob 58 is moved upwardly causing the bread carriage wall portion 50 to pull the piston rod 64 and piston 63 away from the bottom of cylinder 62. Inasmuch as the pneumatic system is in a state of balance wherein the force caused by the subatmospheric pressure below the piston is substantially counterbalanced by the spring 53, every little effort is required to raise the piston sufficiently for the aperture 81 to allow air in behind the piston so that the bread carriage moves to the upper bread withdrawing position. Therefore, the present pneumatic latch arrangement permits the user to raise the bread carriage at any point of the toasting operation without the necessity for any additional mechanism or parts for this particular desirable feature.

In order to provide variable color settings for the toasting operation, color adjustment shaft 118 is threadedly associated with bracket 85 and is disposed to exerting a force upon restrictor spring 110. As may be seen in FIGS. 2, 6 and 7, the color adjustment shaft 118 has threads 119 thereon which are in engagement with a threaded clip 121 which snaps into an opening 122 formed in the first vertical bracket wall 86 so that the shaft 118 is horizontally disposed and is in alignment with end panel opening 39. The outer end of shaft 118 has affixed to it rotatable color control knob 125 which may be easily grasped and selectively rotated by the user. The end of shaft 118 is formed with a pointer 126 of reduced diameter having a substantially spherical end 127. The restrictor spring body portion 111 is stamped with an integral cantilever tongue 129 having a remote unsupported end 130. As can be seen in FIGS. 6 and 7, the color adjustment shaft spherical end 127 is in alignment for engagement with the restrictor spring tongue remote end 130. As the shaft 118 is rotated forcing it to move inwardly toward the restrictor spring 110, the tongue 129 is bent inwardly causing a force to be imposed upon the restrictor spring 110. It should be appreciated that since the restrictor spring 110 is fabricated from resilient sheet material, the displacement of the tongue 129 inwardly exerts a substantially horizontal force upon the restrictor spring. Moreover, this force is effective on the operation of the bimetallic element 98. That is to say, as the shaft 118 moves the restrictor spring tongue 129 towards the bimetallic element 98, less effort is required by the bimetallic element to bow sufficiently to move the valve pad 83 away from the cylinder valve port 80, and consequently, the element opens the valve port at a lower temperature. Correspondingly, as the control shaft 118 is moved away from the tongue 129, less aid is given to the bimetallic element 98 requiring a higher temperature in order for the bimetallic element to move the valve pad 83 away from the valve port 80. Therefore, the rotation of color control knob 125 by the user varies the terminal toasting temperature of the bread slice and its color.

After the bimetallic element 98 has caused the valve pad 83 to open the cylinder valve port 80 allowing the bread carriage 45 to move to its upper bread withdrawing position, the electrical circuit is deenergized inactivating heating units 31 and 32. As the bimetallic element cools, the valve pad 83 is biased into closed sealing engagement with the cylinder valve port 80. To assist in returning the bimetallic element 98 to a position closing the cylinder valve port 80 and also to remove heat from the bimetallic element 98, the bread carriage rack 46 disposed within toasting chamber 29 is provided with a wiper 133 having a U-shaped portion 134 in frictional engagement with the rack 46 and a cantilever curved arm 135 disposed to engage and slide against the bimetallic element 98 and to bias it towards the cylinder 62 as the bread rack 46 moves from the lower toasting position to the upper toast withdrawing position. The wiper 133 is shown in FIG. 2 forcing the bimetallic element 98 toward the cylinder 62. It is appreciated by those skilled in the art that wiper 133 remains relatively cool since it is disposed below the heating units 31 and 32 during the toasting operation. The frictional engagement between the wiper U-shaped portion and the rack 46 permits it to be properly located on the rack after assembly since it may be easily removed longitudinally with respect to the rack 46 towards or away from the bimetallic element 98.

At this juncture, further consideration should be given to the valve pad 83 which is used to open and close the cylinder valve port 80. In FIG. 10 the valve pad 83 and actuator arm finger 105 are shown in section in their unassembled state while FIG. 11 shows them after assembly. Valve pad 83 is preferably fabricated from silicone rubber tubing having a bore of approximately .040 inch, a wall thickness of approximately .040 inch and being approximately ⅛ inch in length. The actuator arm finger 105 has a cross section which is approximately .018-inch thick and ⅛ inch wide. As the valve pad is stretched so that it encompasses the finger 105, the portions of the valve pad adjacent to the edges of the finger become relatively thin while the thickness of the valve pad is greater near the center of the longer sides. Therefore, the portion of the valve pad 83 which is in alignment with the cylinder valve port 80 is curved to facilitate establishing an air tight seal therebetween. The valve pad 83 is relatively pliable since the silicon rubber has approximately a fifty durometer. It should also be appreciated that the closed loop comprising bracket arm 89, thermostatic element 98, actuator arm 103 and restrictor spring 110 is oriented so that there is a biasing force urging the valve pad 83 into engagement with the valve port 80 causing the valve pad to conform to the configuration of the cylinder 62. However, having the valve pad 83 rounded at the portion in connection with the valve port 80 maintains the air seal therebetween while the valve pad is slowly moved away from the cylinder 62 due to the influence of the bimetallic element 98.

Referring now to FIG. 12, there is disclosed an alternate embodiment wherein the bread does not rest upon the bread carriage rack 46 when the bread carriage 45 is latched in its lower position. In this embodiment, bread guides 137 are employed in combination with standard bread guide 34. However, bread guides 137 have integrally formed, horizontally extending suporting projections 138 formed with vertically extending ribs 139. The projections 138 extend substantially across the toasting chamber 29 and are spaced so that there is adequate clearance between them and bread racks 46 so that the bread racks may pass below the projections 138 without interference. Thus, when the bread carriage 45 is lowered to the toasting position, the bread is lifted off the racks as the rack moves below projections 138. It should be noted, however, that the distance between the rack 46 and the projection 138 is relatively short. The purpose of this arrangement is to have removed the bread from the rack 46 at the time when the bread rack 46 begins to move upwardly. In some instances, bread tends to weld itself to the bread guides so that more force is necessary to move the bread rack upwardly. As noted hereinabove, the valve pad 83 moves very slowly away from the valve port 80, and consequently, the piston 63 moves upwardly very slowly initially. With this alternate construction, the bread carriage does not have to lift the bread initially, and the carriage is permitted to move upwardly until the piston sealing lip 75 passes over aperture 81 before the rack 46 engages with the bread being supported on bread guide projections 138. In this manner, the bread carriage has gained momentum in its upward movement and can easily disengage bread which might have become affixed to the bread guides by the impact of the bread carriage striking against the bread slice.

From the foregoing detailed description, the construction and operation of the toaster of the present invention will be readily understood. The improved pneumatic latching means of the present invention not only efficiently functions properly but is also easily and inexpensively manufactured by eliminating costly and complicated latching mechanisms commonly found on other toasters. Furthermore, the thermostatic control means is integrated with the pneumatic latching means and is supported on a common bracket forming a single compact assembly which latches the bread carriage and also controls the toasting operation. In the present invention, the thermostatic control means is fabricated from a minimum of parts and utilizes the bracket which also supports the pneumatic latching means to form a part of its structure.

What is claimed as new and desired to be secured by Letters Patent of the United States is:

1. In an electric toaster comprising a housing, a bread carriage mounted within said housing for movement between a bread slice receiving position and a toasting position, means for moving said carriage to said toasting position, bracket means secured to said housing and having an arm attached to one end of a bimetallic element disposed to respond to the temperature of the bread slice, an actuator secured to the other end of said bimetallic element and secured to said bracket means, said actuator being provided with a valve element, pneumatic means secured to said bracket means for holding said carriage in said toasting position, said pneumatic means including a closed end cylinder having a valve port near its closed end, said valve element disposed to open and close said valve port in response to movement of said bimetallic element.

2. In the electric toaster of claim 1 wherein said closed end cylinder being formed with a wall and said valve port being an opening through said wall, said valve element being formed of pliable material which can conform to said wall for closing said opening so that no air can pass therethrough.

3. In the electric toaster of claim 1 wherein said actuator being attached at one end to said bimetallic element and at the other end attached to a spring which is attached to said bracket means, color control means secured to said bracket means and disposed for applying a selectable force upon said spring for varying the temperature at which said bimetallic element opens and closes said valve port by moving said valve element.

4. In the electric toaster of claim 1 wherein said pneumatic means including a shaft having at one end a piston adapted for sliding within said closed end cylinder and the other end having locking means, spring means within said housing biasing said bread carriage toward said bread slice receiving position, said shaft passing through said bread carriage with said locking means above said bread carriage, spring means secured to said shaft between said piston and bread carriage whereby said piston can bottom within said cylinder before said bread carriage stops at said toasting position.

5. In an electric toaster comprising a housing, a bread carriage mounted within said housing for movement between a bread slice receiving position and a toasting position, means within said housing biasing said bread carriage toward said bread slice receiving position, pneumatic latching means interconnecting said carriage and said housing for holding said carriage in said toasting position, said pneumatic latching means including a closed end cylinder with the closed end facing downwardly and a shaft having a piston at its lower end adapted for sliding within said cylinder and its upper end engageable with said bread carriage, said cylinder closed end formed with an integral well for receiving said shaft lower end having a non-uniform periphery wall, said housing including a wall having a non-uniform opening complementary to said well peripheral wall and into which said wall extends and is attached.

6. In the toaster of claim 5 wherein said cylinder is provided with a valve port near its closed end, a thermostatic control means mounted within said housing and having a valve element adapted to cooperate with said cylinder valve port, said non-uniform well and said valve port being oriented whereby the assembly of said well to said housing wall aligns said valve port with respect to said valve element.

7. In the toaster of claim 5 wherein said shaft lower end extends through said piston, said cylinder closed end conforms with said shaft lower end and piston so that at the bottom of piston movement nearly all the air below said piston within said cylinder is displaced whereby very little upward movement of said piston is necessary to establish a pressure sufficiently low below said piston to hold said bread carriage in said toasting position.

8. The combination in a toaster of a frame, a bread carriage movable on said frame between an upper bread slice receiving position and a lower toasting position, means for biasing said carriage to said upper position, heating means for heating a bread slice disposed on said carriage when said carriage is in its lower position, pneumatic latching means interconnecting said carriage and said frame for releasably latching said carriage in said toasting position against the force of said biasing means, said latching means including a cylinder and piston means reciprocably mounted in said cylinder, means for moving said carriage to said lower position to create a partial vacuum in said cylinder whereby said carriage is held in said lower position, said cylinder including wall means having an opening near the bottom thereof, and thermostatic control means responsive to a predetermined heating of the bread slice for actuating a valve element out of sealing engagement with said cylinder wall opening for relieving the partial vacuum and permitting said biasing means to move said carriage to said upper position.

9. The combination of claim 8 wherein said valve element including a portion of pliable material which easily deforms and said portion being engageable with said cylinder wall opening for establishing an air tight seal to prevent the passage of air therethrough.

10. The combination of claim 9 wherein said portion being curved so that the outermost section thereof is in alignment with said cylinder wall opening.

11. The combination of claim 9 wherein said cylinder being formed with an integral closed bottom, said cylinder closed bottom conforming substantially with said piston means whereby at the bottom of the piston stroke said piston means displaces nearly all of the air therefrom so that said piston means is biasing upwardly only a short distance before the partial vacuum is sufficient for latching said bread carriage at said lower toasting position.

12. A toaster comprising a frame, a bread carriage mounted on said frame for movement between a bread receiving position and a toasting position, means biasing said bread carriage toward said bread receiving position, pneumatic latching means interconnecting said bread carriage and said frame for holding said carriage in said toasting position and including valve means for rendering said pneumatic latching means ineffective for permitting said bread carriage to return to said bread receiving position, temperature responsive means secured to said frame and including a bimetallic element and a rigid arm attached at one end thereof for actuating said valve means, the other end of said bimetallic element being secured to said frame, the end of said arm remote from said bimetallic element being connected to a flexible member which is attached to said frame.

13. The toaster of claim 12 wherein said flexible member is substantially parallel to said bimetallic element and moves complementary therewith so that both remains substantially parallel.

14. The toaster of claim 12 including color control means secured to said frame and disposed for exerting a selectable force upon said flexible member for varying the temperature at which said valve means is opened.

15. The toaster of claim 14 wherein said flexible member being formed with an integral tongue portion having a remote end, said color control means engageable with said tongue portion remote end for displacing the same to impose a force upon and normal to said flexible member.

16. The toaster of claim 12 wherein said bimetallic element is vertically disposed adjacent to said bread carriage, a wiper element secured to said bread carriage and disposed to engage and slide along said bimetallic element as said carriage moves from said toasting position to said bread receiving position thereby removing heat from said bimetallic element and urging said bimetallic element towards a position which closes said valve means.

17. An electric toaster comprising a frame, a bread carriage mounted on said frame for movement between an upper bread slice receiving position and a lower toasting position, means for moving said carriage to said lower toasting position, means for biasing said bread carriage to said upper position, latching means holding said carriage in said lower toasting position, means connected to said frame for supporting the bread slices above said bread carriage when it is at said lower toasting position, and temperature responsive means for rendering said latching means ineffective to hold said carriage in said lower toasting position, thereby releasing said carriage and allowing it to move upwardly and impact against the bread slices for raising them to the upper bread slice receiving position.

18. The electric toaster of claim 17 wherein said latching means including pneumatic piston means connected to said bread carriage and a vertically extending cylinder, said cylinder having valve means for holding said carriage in said lower toasting position and for releasing same and having an opening spaced above said valve means, said means supporting the bread slices at a position sufficiently above said carriage at said lower toasting position so that upon release of said carriage said piston means upwardly passes said cylinder allowing air behind said piston means before said carriage picks up the bread slices for carrying them to said upper bread slice receiving position.

19. The electric toaster of claim 18 including vertically extending bread guides connected to said frame, said bread supporting means being integrally formed with said guides and extending normally thereto near the bottom ends of said guides.

References Cited

UNITED STATES PATENTS

| | | | |
|---|---|---|---|
| 2,005,253 | 6/1935 | Braun | 99—391 XR |
| 2,009,634 | 7/1935 | Purpura | 99—391 XR |
| 2,251,925 | 8/1941 | Edmunds et al. | 99—327 |
| 2,621,583 | 12/1952 | Victor | 99—391 XR |
| 2,997,807 | 8/1961 | Woron | 99—327 XR |

BILLY J. WILHITE, *Primary Examiner.*

U.S. Cl. X.R.

99—391